United States Patent

[11] 3,597,815

| [72] | Inventor | Kenneth Elton Fish<br>Warwick, R.I. |
|---|---|---|
| [21] | Appl. No | 846,679 |
| [22] | Filed | Aug. 1, 1969 |
| [45] | Patented | Aug. 10, 1971 |
| [73] | Assignee | Bevis Industries, Inc.<br>Providence, R.I. |

[54] PIN RACK FOR TENTER CHAIN LINK
4 Claims, 9 Drawing Figs.

[52] U.S. Cl............................................ 26/62,
38/102.91, 248/304, 269/53
[51] Int. Cl............................................ D06c 3/10
[50] Field of Search............................................ 269/53;
26/61 A, 62 A, 62 C; 38/102.91; 211/120;
248/304

[56] References Cited
UNITED STATES PATENTS
| 1,576,902 | 3/1926 | De Frehn.................... | 38/102.91 |
| 2,219,192 | 10/1940 | Morrill....................... | 26/62 |

OTHER REFERENCES
Marshall and Williams, Bulletin No. 2— 9, " Pin Tenter Clips," Oct. 23, 1969.

*Primary Examiner*—Andrew R. Juhasz
*Assistant Examiner*—James F. Coan
*Attorney*—William Frederick Werner ABSTRACT: This invention relates to the pin rack carried by the rack carrier of a tenter chain link, such as used, for example, in machines for drying cloth or the like.

Patented Aug. 10, 1971 3,597,815
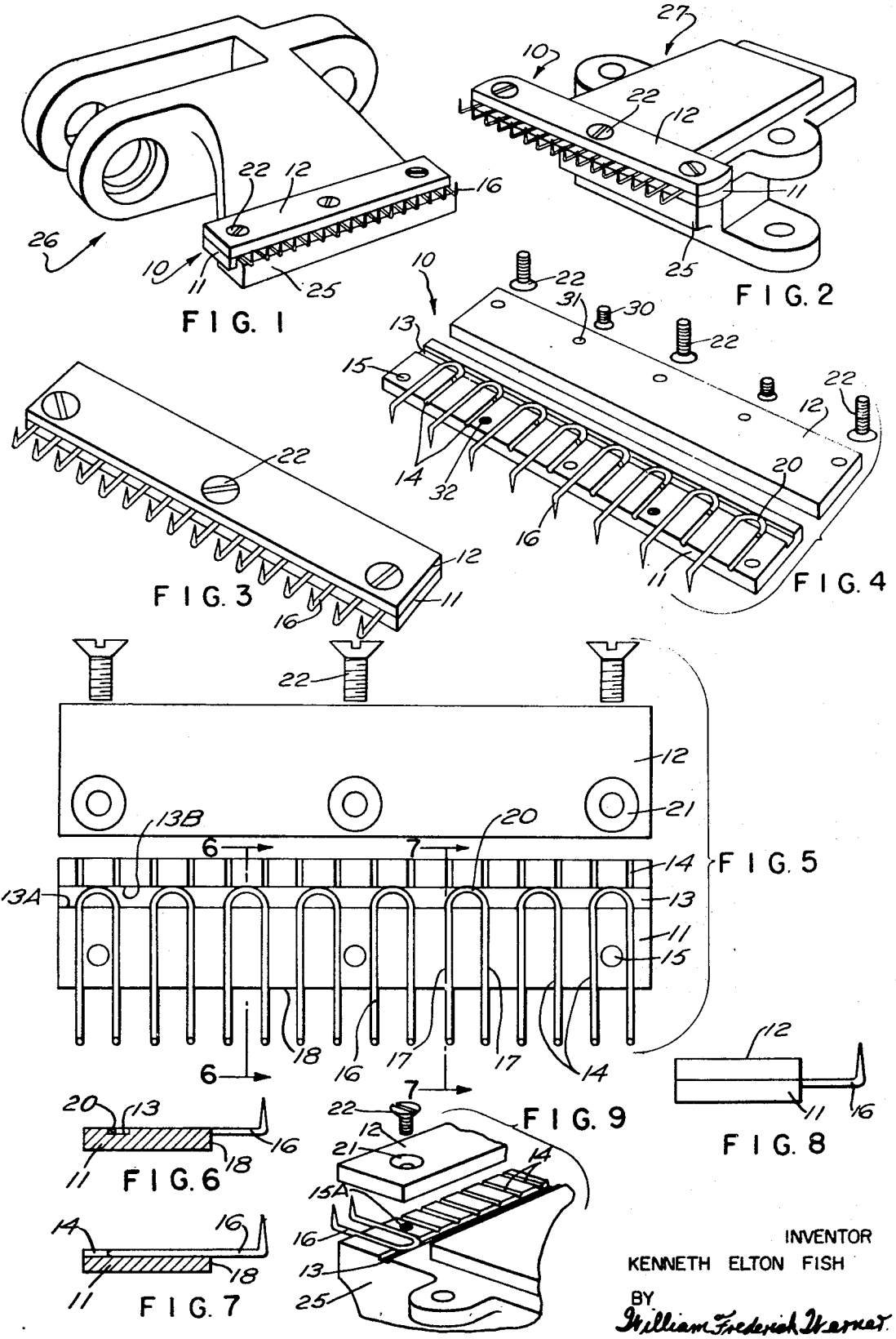
INVENTOR
KENNETH ELTON FISH
BY
William Frederick Werner
ATTORNEY

PIN RACK FOR TENTER CHAIN LINK

This invention relates to tenter chain links and more particularly to a pin rack construction wherein the individual pins are held in a new and novel manner and the material is supported on the pin rack in a new and novel manner.

An object of the present invention is to provide a pin rack construction which eliminates the "ironing" effect on the edge of the material.

In the past the pins in a pin rack rose upward in a vertical plane from the supporting plate or rack carrier of the tenter chain link. The selvage was layed upon the pin rack and was supported by the pin rack or pin plate. As the tenter chain link passed through a drying oven the air circulated through and around the material with the exception of the selvage lying against the pin rack. This caused an "ironing" effect upon the material edge or selvage.

The pins were individually placed in holes in the pin rack. If a pin broke the tenter chain link had to be removed from the tenter chain. The broken pin had to be drilled out of the pin rack and a pin of a larger size was riveted in the new hole in the pin rack. The tenter chain link was then replaced as a link in the chain.

It is an object of the present invention to overcome all of these difficulties by making a sandwich-type pin rack with grooves of a novel construction so that the selvage is supported solely upon the pins and a broken pin can be replaced with the tenter chain link in position as a link in the tenter chain.

In this manner the cost of manufacturing the new pin rack and the cost of replacing a broken pin is greatly reduced because the individual pin is not individually fastened in its individual orifice in the pin rack.

Other objects of the present invention will become apparent in part and be pointed out in part in the following specification and claims.

Like reference numerals refer to like parts in the following drawings in which:

FIG. 1 is a perspective view of one form of tenter chain link with the new pin rack fastened thereon;

FIG. 2 is a perspective view of another form of tenter chain link with the new pin rack fastened thereon;

FIG. 3 is a perspective view of the new and improved pin rack;

FIG. 4 is an exploded perspective view of the new and improved pin rack provided with a modified form of pin;

FIG. 5 is an exploded plan view of the new and improved pin rack;

FIG. 6 is a vertical cross-sectional view, taken along line 6–6 of FIG. 5;

FIG. 7 is a vertical cross-sectional view, taken along line 7–7 of FIG. 5;

FIG. 8 is a left-hand view of FIG. 3.

FIG. 9 is a fragmentary perspective view of a modified form of the present invention.

Referring more particularly to the drawings, the new and improved pin rack, generally indicated by reference numeral 10, includes a lower plate 11 and an upper plate 12.

Lower plate 11 is provided with a plurality of transverse slots 14 and a plurality of clearance holes 15. Plate 11 is also provided with a longitudinal groove 13. The pins 16 are of preselected length and are reversed upon themselves to provide two approximately parallel legs with the reverse bend portion constituting a locking section 20, as will hereinafter appear. The ends of the legs are bent to form cloth-holding sections.

Pins 16 are adapted to lie in adjacent transverse slots 14 with the locking section 20 located in longitudinal groove 12. In this way, locking section 20 of pins 16 engage the walls 13A and 13B of groove 13 so that pins 16 cannot be moved forward or backward in a horizontal plane.

Upper plate 12, provided with countersunk screw orifices 21, overlies lower plate 11 in sandwich fashion, so that screw orifices 21 are aligned with clearance holes 15 in lower plate 11.

Tenter chain links are pivotally connected to form links in a tenter chain. Regardless of the style of the tenter chain link, generally indicated by reference numerals 26 in FIG. 1, and 27 in FIG. 2, the link inherently comprises a support platform or rack carrier 25. Pin-type tenter chain links are generally provided with screw holes whereby the pin rack 10 may be fastened to the rack carrier 25.

In FIGS. 1 and 2 wherein, two of many types of tenter chain links are illustrated, the sandwich plates 11 and 12 are placed upon rack carrier 25 of the tenter chain links and are fastened thereon by means of screws 22 fastened in the screw holes provided for that purpose in rack carrier 25. In this manner upper plate 12 holds pins 16 in the transverse slots 14.

FIG. 4 illustrates pin rack 10, provided with separate fastening means so that pin rack 10 may be shipped as a unit from a factory and fastened to the rack carrier by means of screws 22 as described in relation to FIG. 3. The fastening means shown are screws 30 which pass through countersunk screw orifices 31 in upper plate 12 to engage tapped holes 32 in lower plate 11.

In addition FIG. 4 illustrates that pins 16 may constitute one leg and a locking section 20. It is not necessary that every pin have two approximately parallel legs of equal length adapted for cloth engagement.

FIG. 4 also illustrates that the cloth engaging section of pins 16 may lie in a plane other than upward vertical, as shown in FIG. 3.

The locking section 20 of pins 16, as can be seen in FIGS. 4 and 5, prevents pins 16 from being pulled out of transverse slot 13 engagement when upper plate 12 overlies lower plate 11.

It will be seen that legs 16 project beyond pin rack 10 when pin rack 10 is fastened to rack carrier 25. In this manner the selvage (not shown) held by pins 16 is exposed on opposite sides to the processing atmosphere.

FIG. 9 illustrates that transverse slots 14 and longitudinal groove 13 may be provided directly in rack carrier 25 and thereby be a substitute for lower plate 11. Pins 16 would be inserted and held as previously described. Upper plate 12 would be fastened to rack carrier 25 by means of screws 22 passing through screw orifices 21 to engage tapped holes 15A in rack carrier 25.

Having shown and described a preferred embodiment of the present invention, by way of example it should be realized that structural changes could be made and other examples given without departing from either the spirit or scope of this invention.

What I claim is:

1. A tenter chain link comprising a rack carrier and an exchangeable pin rack, that improvement in the pin rack consisting of a lower plate provided with a plurality of transverse slots and a longitudinal groove, a plurality of pins, each pin consisting of a leg of preselected length, one end of said leg reversed upon itself to form a locking section, the opposite end of said leg being bent to form a cloth-holding section, said leg located in one of said plurality of slots with said locking section located in said longitudinal groove, and an upper plate, a first means removably securing said upper plate to said lower plate and a second means removably securing said pin rack to said rack carrier.

2. A tenter chain link as defined in claim 1 wherein said first means and said second means are the same means.

3. A tenter chain link comprising a rack carrier and a pin rack, that improvement in the pin rack consisting of a lower plate provided with a plurality of transverse slots and a longitudinal groove, a plurality of pins, each pin consisting of two approximately parallel legs integrally connected together by a locking section, the ends of said two legs being bent to form a cloth holding section, said legs located in two of said plurality of slots with said locking section located in said longitudinal groove, and an upper plate, and means fastening said upper plate to said lower plate and to said rack carrier and thereby fastening said legs in said transverse slots and said locking section in said groove.

4. A tenter chain link as defined in claim 3 in which said lower plate forms an integral part of said rack carrier.